United States Patent
Jouppi (10) Patent No.: US 7,079,173 B2
(45) Date of Patent: Jul. 18, 2006

(54) DISPLAYING A WIDE FIELD OF VIEW VIDEO IMAGE

(75) Inventor: Norm Jouppi, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/772,186

(22) Filed: Feb. 4, 2004

(65) Prior Publication Data

US 2005/0168568 A1    Aug. 4, 2005

(51) Int. Cl.
*H04N 7/18* (2006.01)

(52) U.S. Cl. .......................................................... 348/36

(58) Field of Classification Search ................. 348/36, 348/39, 218.1; 382/154; 352/69; 345/9, 345/419, 629, 633

See application file for complete search history.

(56) References Cited

U.S. PATENT DOCUMENTS

| | | | |
|---|---|---|---|
| 5,657,073 A * | 8/1997 | Henley ........................ 348/38 |
| 6,256,046 B1 * | 7/2001 | Waters et al. ............... 345/473 |
| 6,335,754 B1 * | 1/2002 | Endo et al. ................... 348/37 |
| 6,498,620 B1 * | 12/2002 | Schofield et al. ........... 348/148 |
| 6,665,003 B1 * | 12/2003 | Peleg et al. ................... 348/36 |
| 2001/0040671 A1 * | 11/2001 | Metcalf ....................... 353/94 |
| 2004/0027451 A1 * | 2/2004 | Baker .......................... 348/46 |
| 2004/0051805 A1 * | 3/2004 | Yoshikawa et al. ......... 348/335 |
| 2004/0125228 A1 * | 7/2004 | Dougherty ................... 348/345 |
| 2004/0247173 A1 * | 12/2004 | Nielsen et al. .............. 382/154 |

* cited by examiner

*Primary Examiner*—Vu Le (57) ABSTRACT

A system for displaying a wide field of view video image of a location. A series of location cameras disposed at the location captures the wide filed of view video image as a series of individual video images covering the desired field of view. A distance sensor unit senses distances of closest objects in one or more overlap areas between field of views of the location cameras from the two or more location cameras covering each respective overlap area. A display unit displays the series of individual video images to a user for creating a visual experience of the location. A processor unit determines a horizontal span of each individual video image displayed by the display unit based on the sensed distances of the closest objects.

28 Claims, 7 Drawing Sheets

DISPLAYING A WIDE FIELD OF VIEW VIDEO IMAGE

FIELD OF THE PRESENT INVENTION

The present invention relates to wide field imaging.

BACKGROUND OF THE PRESENT INVENTION

Systems that seek to acquire very wide field of view (e.g. 360°) images are significant for a number of applications in both still and motion picture capturing and display. One such system employs a camera rotating around the horizontal of its focal plane used for capturing still panoramic photographs. Many images are taken, ranging from of the order of about 7 for consumer photographs to more than 100 for professional panoramas. The camera is typically mounted on a tripod, with the pan axis centered on the horizontal center of the focal plane. Parallax errors are reduced as the number of images is increased.

Sophisticated software has been recently developed that allows a consumer-quality panorama to be built from a series of handheld images. However, such techniques are based on panoramic still images, and cannot produce video panoramas since the product of exposure time and the number of images that must be taken exceeds the time per frame of a typical video sequence.

In other systems, a single camera coupled with a domed, spherical, or toroidal section mirror is used. The camera is usually mounted in such systems above the mirror so that the camera can see a e.g. 360° surround band around the mirror. The mirror may be placed on a conference room cable to provide a view of everyone sitting around a meeting table or may be plated on a tripod for panoramic landscape pictures.

In yet other systems, multiple mirrors and cameras are utilized to acquire the panoramic views. One such system uses 6 cameras looking down on mirrors arranged in a ring. The mirrors for this system consist of a 6-side pyramid, with different cameras looking down on each of the mirrors. The ring of cameras is supported by a post at the center of the pyramid of mirrors.

SUMMARY OF THE PRESENT INVENTION

One aspect of the present invention provides a system for displaying a wide field of view video image of a location. The system comprises a plurality of location cameras for placement at the location. The location cameras capture the wide field of view video image as a plurality of individual video images that together cover the desired field of view. The system also comprises a distance sensor unit. The distance sensor unit senses distances of closest objects in one or more overlap areas between field of views of the neighboring location cameras. The system further comprises a display unit for displaying the plurality of individual video images to a user for creating a visual experience of the location based on the sensed distances to the closest object.

DETAILED DESCRIPTION OF THE EMBODIMENTS

The system of the example embodiment consists of two main parts, a display system at the user's location and a remotely located surrogate device.

The surrogate device is connected to the display system via high-speed networking in the example embodiment, and stands in the place of the user at the remote location.

Figure 1A:
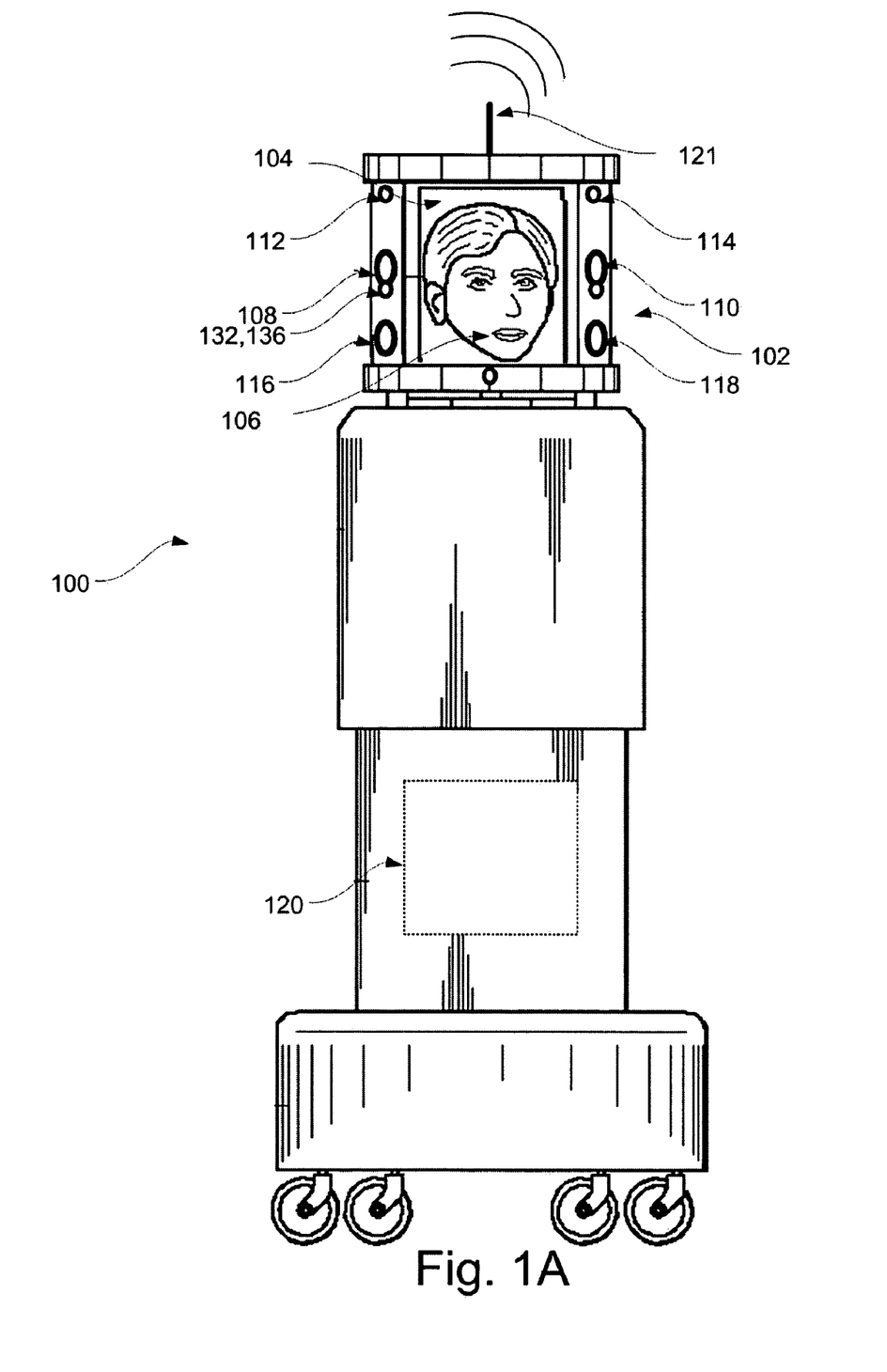
FIG. 1A is a schematic drawing illustrating a front view of a surrogate device in an embodiment of the present invention.

FIG. 1A shows a schematic drawing of the surrogate device 100 of the example embodiment. The surrogate device 100 has a "head" 102 made from four display panels, e.g. 104 in a square, outwardly facing arrangement. Live video of the user's face 106 is displayed on all four sides, namely on all four LCD panels of the surrogate device 100.

Four cameras e.g. 108, 110 in the corners of the surrogate devices head 102 together capture 360° surround live video from the remote location at which the surrogate device 100 is located. The cameras e.g. 108, 110 are positioned near the mid-point of the height of the displays e.g. 104 in the example embodiment, to achieve a proximity to the eye-level of the displayed user face 106.

Four directional microphones e.g. 112, 114 are also provided in the corners of the surrogate devices head 102 for capturing the remote sound field. The surrogate device head 102 also comprises speakers e.g. 116, 118 in the corners of the surrogate device's head 102 for transmitting a sound field from the user's location at the remote location.

The surrogate device 100 further comprises an internal computer unit 120 for connecting to the cameras and microphones, processing data, and sending it to the display system. The computer unit 120 also receives live video of the user's head 106 and displays it on the four display screens e.g. 104. The surrogate device also receives audio signals from the user, and then processes and outputs the signals to the speakers e.g. 116, 118.

The video data from the four cameras, e.g. 108, 110 is compressed and transmitted over a high-speed network (not shown) to computers at the location of the display system. An antenna 121 is utilized in the example embodiment for wireless connection to the network.

Figure 1B:
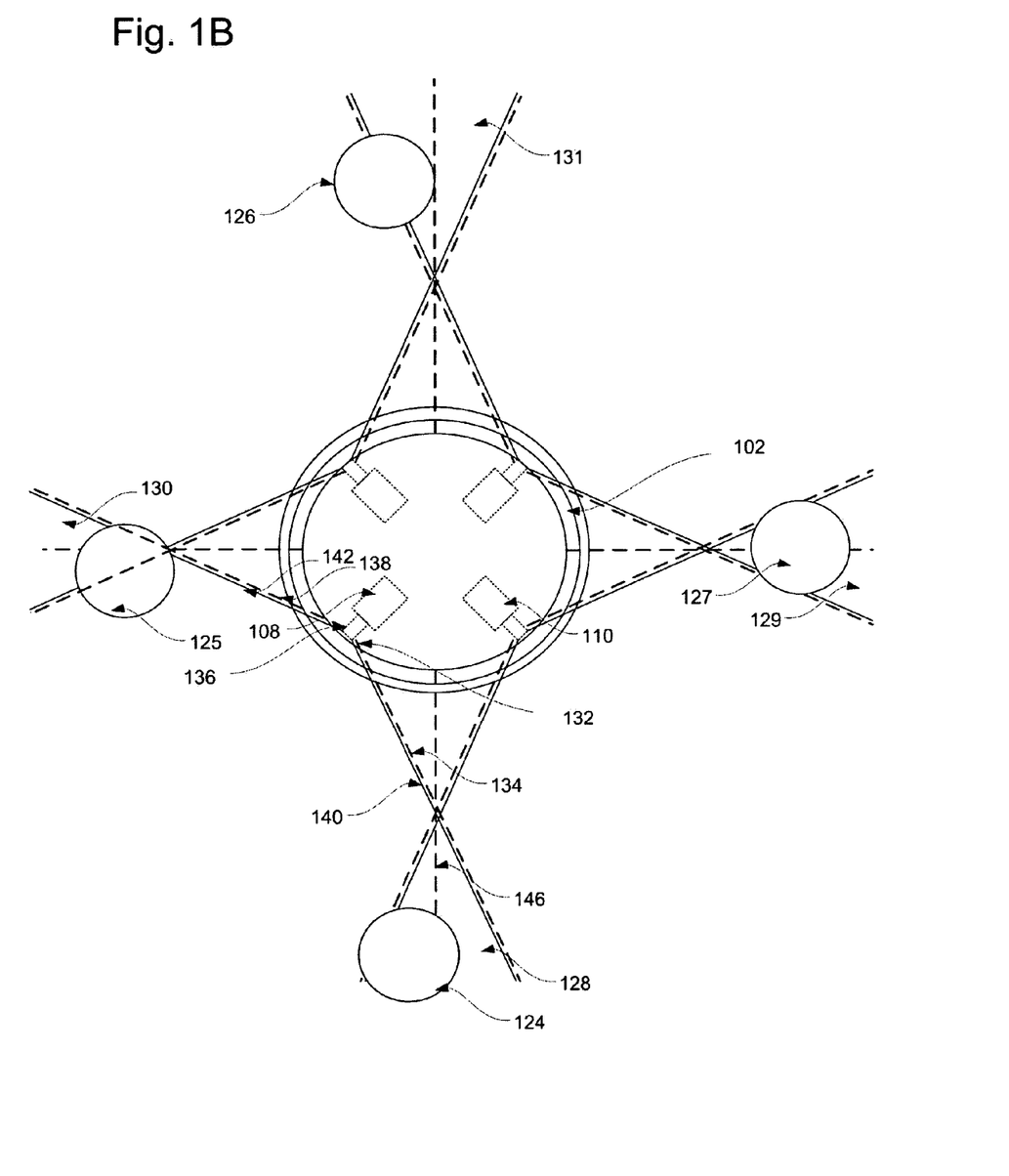
FIG. 1B is a schematic drawing illustrating a top view of the surrogate device of FIG. 1A.

FIG. 1B shows a schematic drawing of a top view of the surrogate device 100. This drawing illustrates how the four cameras, e.g. 108, 110 together capture a 360° field of view around the surrogate devices head 102. Objects are located around the surrogate 100, including objects 124 to 127 at different distances in overlap regions 128 to 131 of field of views of adjacent cameras.

Figure 2:
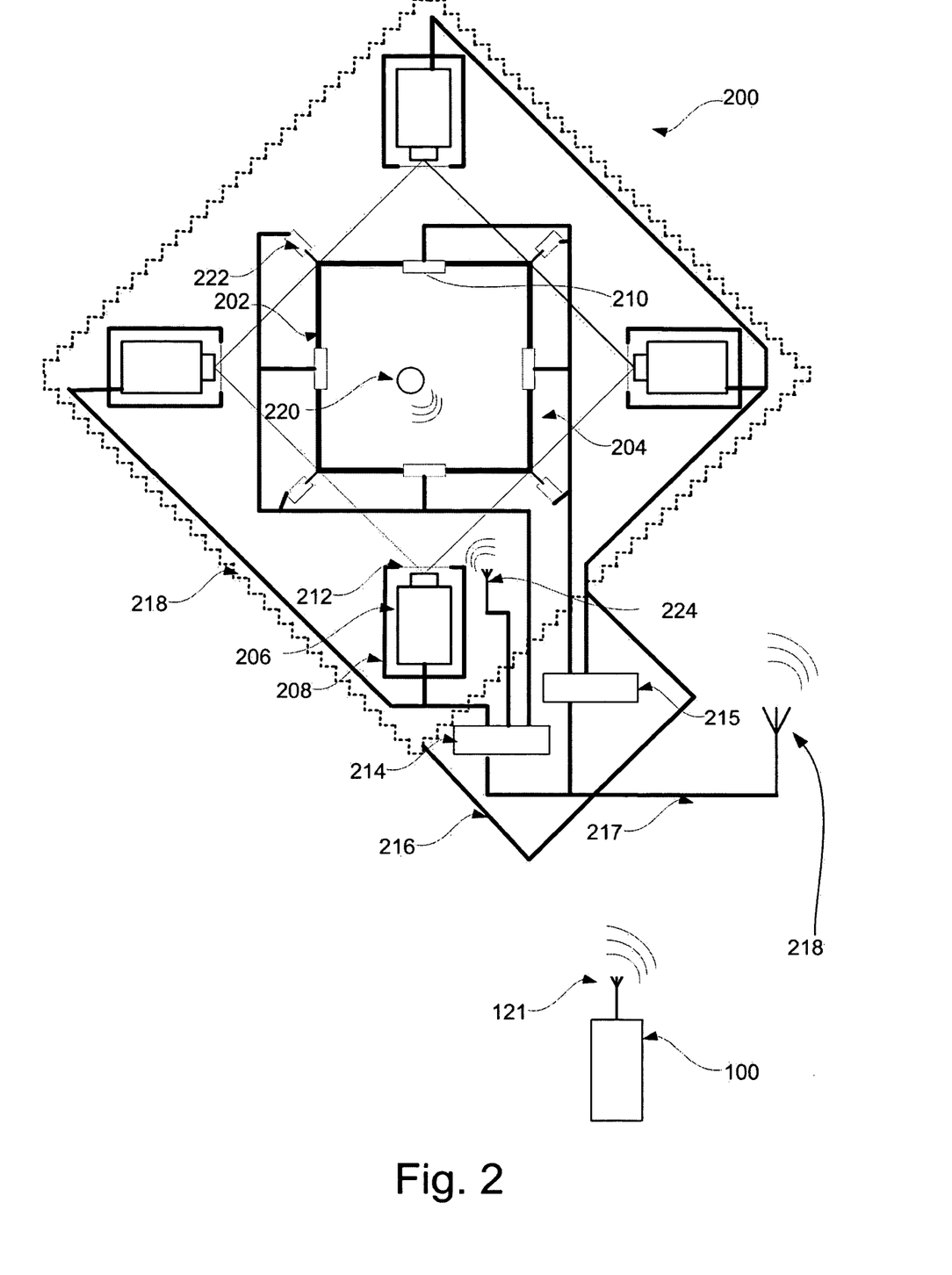
FIG. 2. is a schematic drawing illustrating a display system in an embodiment of the present invention.

FIG. 2 is a schematic drawing of one example of a display system 200 that can be used in connection with the surrogate device 100. The video from the surrogate device 100 (see FIG. 1A) is projected on the walls/screens e.g. 202 of a display cube 204 by four projectors e.g. 206. The projectors e.g. 206 are housed in "hush boxes" e.g. 208 to make them virtually inaudible in the example embodiment. Speakers e.g. 210 are mounted above and below each projection screen e.g. 202 of the display cube 204.

The hush boxes e.g. 208 in the example embodiment are built using sound isolation techniques familiar to a person skilled in the art. Each box e.g. 208 has a double-pane window 212 for the projector light beam to shine out of the box 208 and onto the screen 202. Each box e.g. 208 also has measures for adequately cooling the projectors 206.

Computers 214, 215 are placed in an adjacent room 216 for sound isolation purposes, and drive the projectors e.g. 206 and the speakers e.g. 210 with video and audio information transmitted from the surrogate device 100 (see FIG. 1) at the remote location via network 217. The network 217 of the present embodiment includes an antenna 218 to enable wireless communication with the surrogate 100, via its respective antenna 121.

Anechoic foams are placed on the walls of the room 218 in the example embodiment, for eliminating local reflections. Stray reflection of the light is reduced and the contrast of the display screens e.g. 202 is increased by using black anechoic foams.

The user 220 is located inside the display cube 204, which includes a suitable entrance arrangement (not shown) in at least one of the walls e.g. 202. The images on the projection screens e.g. 202 are presented in life size in the example embodiment. This means that the angle sub-tended by objects on the screen is about the same angle as if the user 220 was actually at the remote location viewing the objects themselves. It will be appreciated by a person skilled in the art that the reproduction is not exact unless the user's head is centered in the display cube 204. Life size presentation of both local and remote participants in the example embodiment is advantageous for preserving the gaze of the participants.

Cameras e.g. 222 are provided in each corner of the display cube 204 which take video images of the user 220 for display on the display panels e.g. 104 of the surrogate device 100 (see FIG. 1A). The user 220 wears a wireless lapel microphone (not shown). A receiver 224 connected to one of the computers 214 receives the audio data from the lapel microphone in the example embodiment. The video and audio data from the cameras e.g. 222 and the wireless microphone is transmitted over the high-speed network 217 via a wireless communications channel to the surrogate device 100 (see FIG. 1A).

Figure 3:
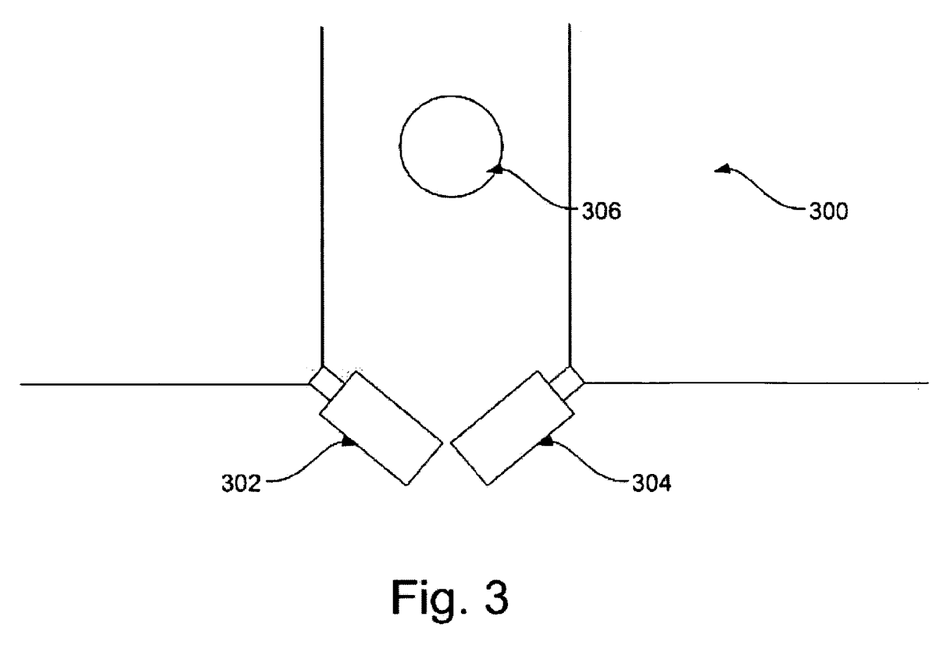
FIG. 3 is a schematic drawing illustrating a parallax artifact.

In the following, it will be described how parallax artifacts are automatically corrected in the example embodiment. Because the cameras e.g. 108, 110 in the surrogate device's head 102 (see FIG. 1) cannot have a common optical center at the same level as the display of the user's eyes on the display panels e.g. 104 (see FIG. 1A), parallax results. This parallax causes visibility gaps and/or duplication of imagery between adjacent images. For example, consider a geometry 300 as illustrated in FIG. 3, where the cameras 302, 304 have a 90-degree field of view. If a person 306 at the remote location stands between the two cameras 302, 304, the user cannot see them.

Figure 4:
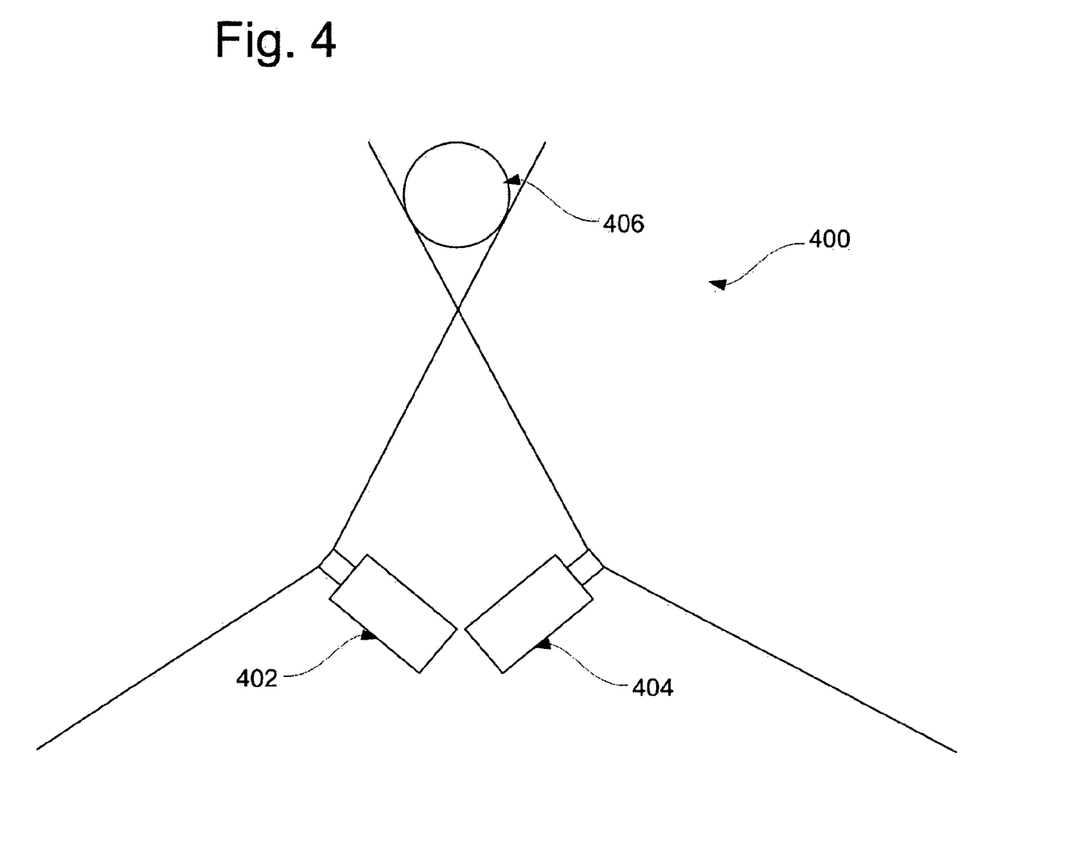
FIG. 4 is a schematic drawing illustrating a parallax artifact.

Consider instead a geometry 400 shown in FIG. 4, where the field of view of the cameras 402, 404 is widened to 143°. Here, the user will see two copies of a person 406 standing in the overlap region 408 of the field of views of the cameras 402, 404, one projected on each of adjacent display wall at the user's location. While this is an improvement over not seeing the person at all, it is still less than desirable in most situations. For example, if the two copies of the person are presented, this introduces errors in preserving the gaze of both the user and the remote person.

It has been recognized by the inventors that if an object at the remote location is located at exactly the point where the outermost rays captured by the cameras intersect, the user will see only one copy of that object, projected in the area where adjacent projection screens come together.

Thus, partial automatic correction of parallax artifacts can be enabled in an example embodiment of the present invention, by adjusting the horizontal span of the displayed images from each camera depending on the nearest distance to an object at the edges of each camera's field of view. One copy of the closest object or person is projected for the user independent of the distance of the closest object or person from the surrogate device in the example embodiment.

Returning now to FIG. 1B, this is accomplished in the example embodiment by measuring the distance from the surrogate device 100 to objects e.g. 124 in the overlap area 128 of the vertical edges of the fields of view of cameras 108, 110 and modifying the horizontal field of view of the projected images so that they intersect at the distance of the closest object in that overlap area 128.

It will be appreciated that the distance to objects in the overlap area of two adjacent cameras can be acquired using a number of methods, one of which will be discussed below for the example embodiment.

The example embodiment utilizes infrared sensors e.g. 132 of a type that sends out a narrow beam 134 and based on the distance of the object it reflects from, the beam illuminates different pixels in a linear array of photocells (not shown). The corresponding distance can be read out over a serial bus by the computer unit 120 (see FIG. 1A).

A pair of infrared sensors e.g. 132, 136 is used in the example embodiment for each camera e.g. 108, which send out narrow beams 134, 138 along respective field of view boundary lines 140, 142. The beams 134, 138 are directed downwardly to substantially follow the bottom left and right corners of the extending field of view of the camera 108.

Four additional infrared sensors e.g. 144 are provided in the example embodiment and are positioned centrally below the displays e.g. 104 of the surrogate device 100 (see FIG. 1A). Each of the four additional sensors e.g. 144 sends out a narrow beam 146 which extends horizontally and centrally through the overlap area 128 of two cameras 108, 110. The distance to the nearest object is computed as the minimum distance reported by all the sensors monitoring the area between a pair of cameras.

Figure 1C:
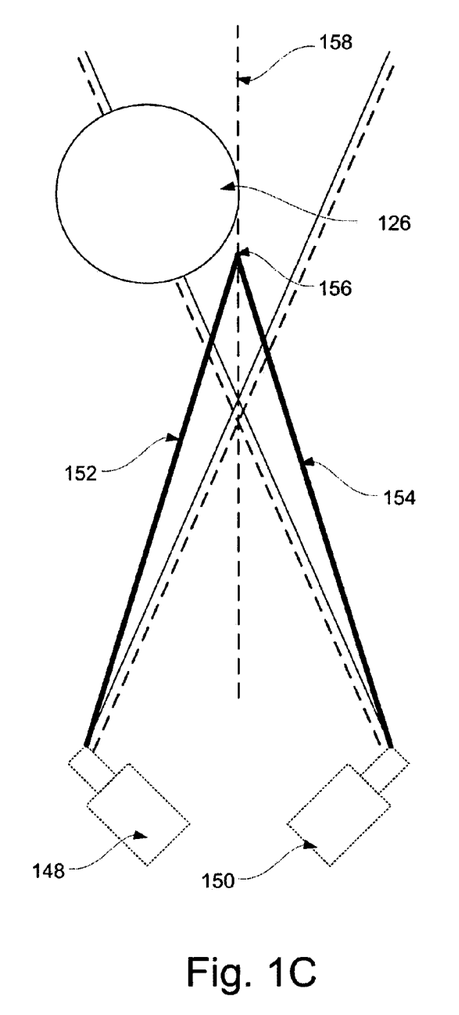
FIG. 1C is a schematic drawing illustrating a detail of FIG. 1B for one object configuration.
Figure 1D:
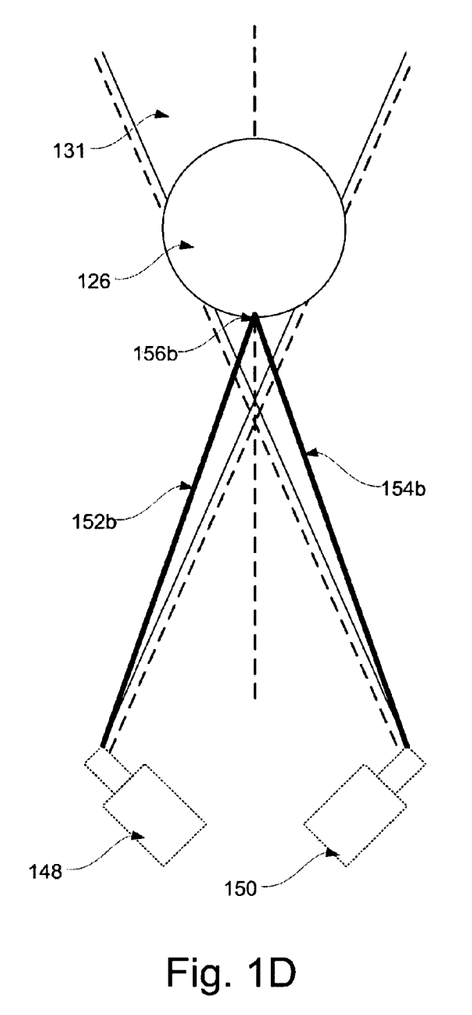
FIG. 1D is a schematic drawing illustrating a detail of FIG. 1B for another object configuration.

Once the distance to the nearest object in the overlap area is known, the horizontal field of view of a display of images from the cameras adjacent to the overlap area can be modified. FIGS. 1C and 1D illustrate two different scenarios for adjusting the displayed horizontal field of view depending on closest objects in the overlap region 131 between adjacent cameras 148, 150.

Turning initially to FIG. 1C, the closest object 126 in that scenario is located on the left side of the overlap region 131. In this scenario, vertical edges 152, 154 of the displayed images from cameras 148 and 150 respectively are chosen such that they intersect at point 156 at the measured object distance on a line extending centrally through the overlap region 131, which coincides with the narrow beam 158 from one of the distance sensors. It will be appreciated that thus, the object 126 will be visible substantially only on the image originating from camera 148, but not on the image originating from camera 150.

In the scenario shown in FIG. 1D, the object 126 is centrally located within the overlap region 131. Here, the vertical edges 152b and 154b of the displayed images originating from cameras 148 and 150 respectively are chosen to intersect at point 156b. In this geometry, the shortest distance to the object 126 is detected by the narrow beam 156 of the central sensor, which can be used directly to determine the intersection point 156b.

It will be appreciated that respective "halves" of the object 126 will be visible in the images from cameras 148 and 150 respectively, thus avoiding undesired duplication of the object 126 in the displayed wide field of view video image.

There are four cameras and a 360-degree surround view is synthesized in the example embodiment. The vertical field of view displayed should therefore preferably be the same in all four images. If the vertical field of view were not the same throughout, there would be discontinuities where parts of an object appeared taller or shorter than other parts.

Having a uniform vertical field of view displayed means that any changes to the horizontal field of view displayed must be made without affecting the vertical field of view—i.e., anamorphically. Also, the distance to the nearest object in each of the four overlap areas 128 to 131 around the surrogate device 100 will usually be different from each other. The modification of each projected image is preferably a function of the nearest distance in both of its adjacent overlap areas.

As distances to the closest objects change during the capture of the individual video images, the horizontal scaling may be continually adjusted in real-time, if desired. It will be appreciated that a number of different approaches to modifying the horizontal scale can be employed. One approach will be described below for the example embodiment. The pixel column of the desired left and right edges of the imagery on the screen is calculated, and a single horizontal scale is computed. In this approach scale transition artifacts would be limited to the seam between screens, which already has a number of artifacts due to the screen discontinuity. Any artifacts from a transition in a horizontal scale should be less evident there. The desired left and right edges of the projected image can be found from trigonometry.

Figure 5:
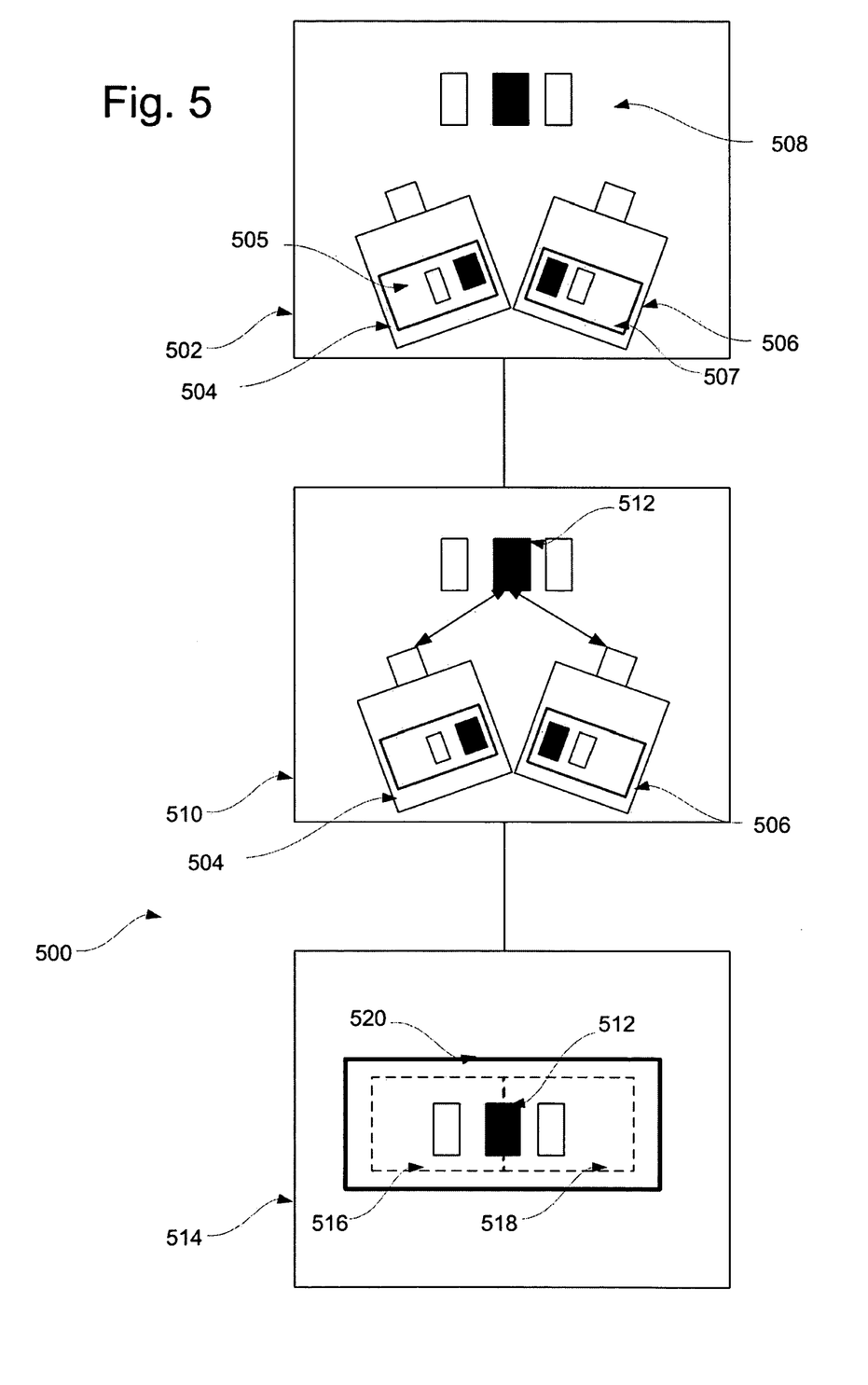
FIG. 5 is a flowchart illustrating a method of displaying a wide field of view video image in an embodiment of the present invention.

FIG. 5 shows a flowchart 500 illustrating a method for displaying a wide field of view video image embodying the present invention. At step 502, a plurality of cameras 504, 506 are used to take individual video images 505, 507 of a location 508, together covering a desired wide field of view.

In step 510, distances of the nearest object 512 at the overlap area the adjacent edges of the individual field of views of the cameras 504, 506 to each of the cameras 504, 506 is measured.

In step 514, the distance information is utilized to anamorphically adjust the horizontal span of the individual displayed images 516, 518 to form a composite wide field of view image 520. In the composite image 520, one half of the object 508 is displayed in each partial image 516, 518 respectively.

It will be appreciated by the person skilled in the art that numerous modifications and/or variations may be made to the present invention as shown in the specific embodiments without departing from the spirit or scope of the invention as broadly described. The present embodiments are, therefore, to be considered in all respects to be illustrative and not restrictive.

For example, while infrared sensors have been used in the described embodiment to sense the distances of the nearest objects, it will be appreciated that the present invention can be implemented utilizing a variety of different sensing techniques, including e.g. ultrasonic sensors or stereo vision technique sensor implementations.

Furthermore, while the adjusting of the horizontal span of the displayed images in the example embodiment includes computing a single horizontal scale, in different embodiments the horizontal scale could be modified by e.g. dividing the screen in half and modifying the horizontal scaling of each half screen. In the region between the half screens, the horizontal scale could e.g. be gradually changed, to reduce scale transition artifacts at the seam between the half screens.

It will also be appreciated that the present invention is not limited to the use of four cameras to capture the desired wide field of view video image. Rather, the number of cameras can be chosen to suit a particular desired coverage of the wide field of view, both horizontally and vertically, and also in terms of depth coverage between adjacent field of views of the individual cameras.

Similarly, the number and configuration of distance sensor elements can be chosen in different embodiments to achieve a desired coverage and depth resolution.

What is claimed is:

1. A system for displaying a wide field of view video image of a location, the system comprising:
   a plurality of location cameras for placement at the location to capture the wide field of view video image as a plurality of individual video images together covering the desired field of view;
   a distance sensor unit for sensing distances of closest objects in one or more overlap areas between field of views of the location cameras from the two or more location cameras covering each respective overlap area; and
   a display unit for displaying the plurality of individual video images to a user for creating a visual experience of the location based on the sensed distances to the closest object.

2. The system of claim 1 further comprising a processor unit for determining a horizontal span of each individual video image displayed by the display unit based on the sensed distances of the closest objects.

3. The system of claim 2, comprising four location cameras in a square arrangement for capturing an outwardly directed 360° field of view of the location, and the display unit comprising four display screens in a square arrangement, each display screen arranged for displaying the individual video image of one of the location cameras to a user located inside the square screen arrangement.

4. The system of claim 2, wherein the processor unit is arranged for calculating pixel column positions for desired horizontal frame edges of each displayed individual video image, and for determining a horizontal scale for each displayed individual video image based on the calculated pixel column positions.

5. The system of claim 2, wherein the display unit is arranged for effecting a change in the horizontal span of each displayed individual video image without changing a vertical span of each displayed individual video image.

6. The system of claim 2, further comprising at least one user camera for capturing at least one video image of the user, and a second display unit for placement at the location to display the captured video images of the user at the location.

7. The system of claim 6, wherein the system includes a plurality of user cameras and the second display unit comprises a plurality of screens, each screen arranged for displaying a video image from the user cameras.

8. The system of claim 6, wherein the second display unit is integrated with a structure for placement of the location cameras at the location.

9. The system of claim 2, wherein the distance sensor unit comprises a pair of sensor elements associated with each location camera, and wherein the sensor elements of the pair are arranged for sensing distances of closest objects from the associated location camera along opposite vertical edges of the field of view of said associated location camera.

10. The system of claim 9, wherein the distance sensor unit comprises a further sensor element between paired adjacent location cameras for sensing distances of closest objects along a line extending substantially centrally through an overlap area of the respective fields of view of the adjacent location cameras.

11. A system for displaying a wide field of view video image of a location, the system comprising:

a display unit for displaying a series of individual video images from a series of location cameras together covering the wide field of view to a user for creating a visual experience of the location wherein a horizontal span of each individual video image displayed by the display unit is determined based on distances of identified objects in one or more overlap areas between field of views of the location cameras from the two or more location cameras covering each respective overlap area.

12. The system of claim 11 wherein the display unit comprises a plurality of display screens arranged to display a 360° field of view.

13. The system of claim 12 wherein the display unit comprises four screens arranged in a square.

14. A system for capturing a wide field of view video image of a location, the system comprising:

a series of location cameras for placement at the location to capture the wide field of view video image as a plurality of individual video images together covering the desired field of view; and a distance sensor unit for sensing distances of closest objects in one or more overlap areas defined by respective fields of view of neighboring location cameras covering each respective overlap area.

15. The system of claim 14 further comprising a processor unit for generating display information for use during display of the individual video images to a user for creating a visual experience of the location, the display information comprising the sensed distances of the closest objects.

16. A method for displaying a wide field of view video image of a location, the method comprising the steps of:

capturing the wide field of view video image as a plurality of individual video images captured by a plurality of location cameras together covering the desired field of view;

sensing distances of closest objects in one or more overlap areas defined by the respective fields of view of neighboring location cameras, determining a horizontal span of each individual video image to be displayed by a display unit based on the sensed distances of the closest objects; and displaying, the plurality of individual video images, in accordance with the determined horizontal span of each video image, to a user for creating a visual experience of the location.

17. The method of claim 16 further comprising, calculating pixel column position for desired horizontal frame edges of each displayed individual video image; and determining a horizontal scale for each displayed individual video image based on the calculated pixel column positions.

18. The method of claim 17 further comprising, sealing each individual video scaling image to be displayed by changing the horizontal span of each individual video image without changing a vertical span of each individual video image.

19. The method of claim 16, wherein, sensing distances of closest objects from the associated location camera, includes sensing a distances of the objects from the associated location camera along opposite vertical edges of the field of view of said associated location camera.

20. The method of claim 19 further comprising sensing distances of closest objects along a line extending substantially centrally through an overlap area of the respective fields of view of adjacent location cameras.

21. A system for displaying a wide field image comprising:

a plurality of cameras arranged such that respective image capture fields of neighboring cameras overlap in an overlap region;

at least one distance sensor for determining a distance to an object identified in each overlap region, and a display unit for displaying a plurality of contiguous image segments forming the wide field image, each image segment being derived from an image captured by one of said plurality of cameras at least partly on the basis of the distance to an object identified in the overlap region between the camera and at least one neighboring camera.

22. The system of claim 21, wherein the wide field image has a field of view of 3600, and wherein the plurality of cameras are arranged around a central axis in a formation having a combined image capture field of 360°.

23. The system of claim 21, wherein the plurality of cameras includes four cameras arranged in a square, with each camera having an image capture field spanning at least 90°.

24. The system of claim 23 wherein the display unit comprises four display screens in a square arrangement, wherein each display screen is configured to display an image segment derived from an image captured by a different one of the plurality of cameras.

25. The system of claim 24 wherein the display unit is configured to provide a user with a panoramic view of a remote location at which the plurality of cameras are located.

26. The system of claim 25 wherein the system further includes a remote unit, housing the plurality of cameras, and that is located at the remote location.

27. The system of claim 26 wherein the system further includes at least one camera associated with the display unit that is configured to capture an image of the user of the remote display unit, and wherein the unit includes at least one display screen to display the captured image of the user of the display unit.

28. The system of claim 27 wherein the remote unit is configured to provide an avatar for the user of the display unit at the remote location.

* * * * *